United States Patent [19]
Brown

[11] Patent Number: 5,303,136
[45] Date of Patent: Apr. 12, 1994

[54] ARTICULATED LAMP

[75] Inventor: Tobias A. Brown, Wilton, Conn.

[73] Assignee: Nessen Lighting, Inc., Mamaroneck, N.Y.

[21] Appl. No.: 995,129

[22] Filed: Dec. 22, 1992

[51] Int. Cl.⁵ .............................................. F21M 3/18
[52] U.S. Cl. .................................... 362/421; 362/413; 362/287; 285/907; 403/76; 403/122
[58] Field of Search ........................ 362/413, 421, 287; 285/164, 907; 403/76, 122

[56] References Cited

U.S. PATENT DOCUMENTS

| | | | |
|---|---|---|---|
| 1,927,703 | 9/1933 | Glowacki | 362/421 |
| 3,278,203 | 10/1966 | Snyder | 362/421 |
| 4,700,017 | 10/1987 | Morand | 362/421 |
| 5,132,492 | 7/1992 | Wieder | 362/421 |

*Primary Examiner*—Carroll B. Dority
*Attorney, Agent, or Firm*—Fitzpatrick, Cella Harper & Scinto

[57] ABSTRACT

An articulated lamp is disclosed which is formed of a vertical support arm and a transverse support arm articulated to the top of the vertical arm and having a lamp head articulated on one end thereof. The arms are connected to each other by an articulation joint which permits restricted universal movement, in order to protect the power supply wires passing through the arms. The head is articulated to the transverse arm by an articulated joint which is formed of components that are identical in construction to the components forming the joint between the arms. The articulation joint between the transverse arm and the head also permits universal movement of the head relative to the arm, but again with restricted degrees of movement to protect the wiring of the lamp.

38 Claims, 3 Drawing Sheets

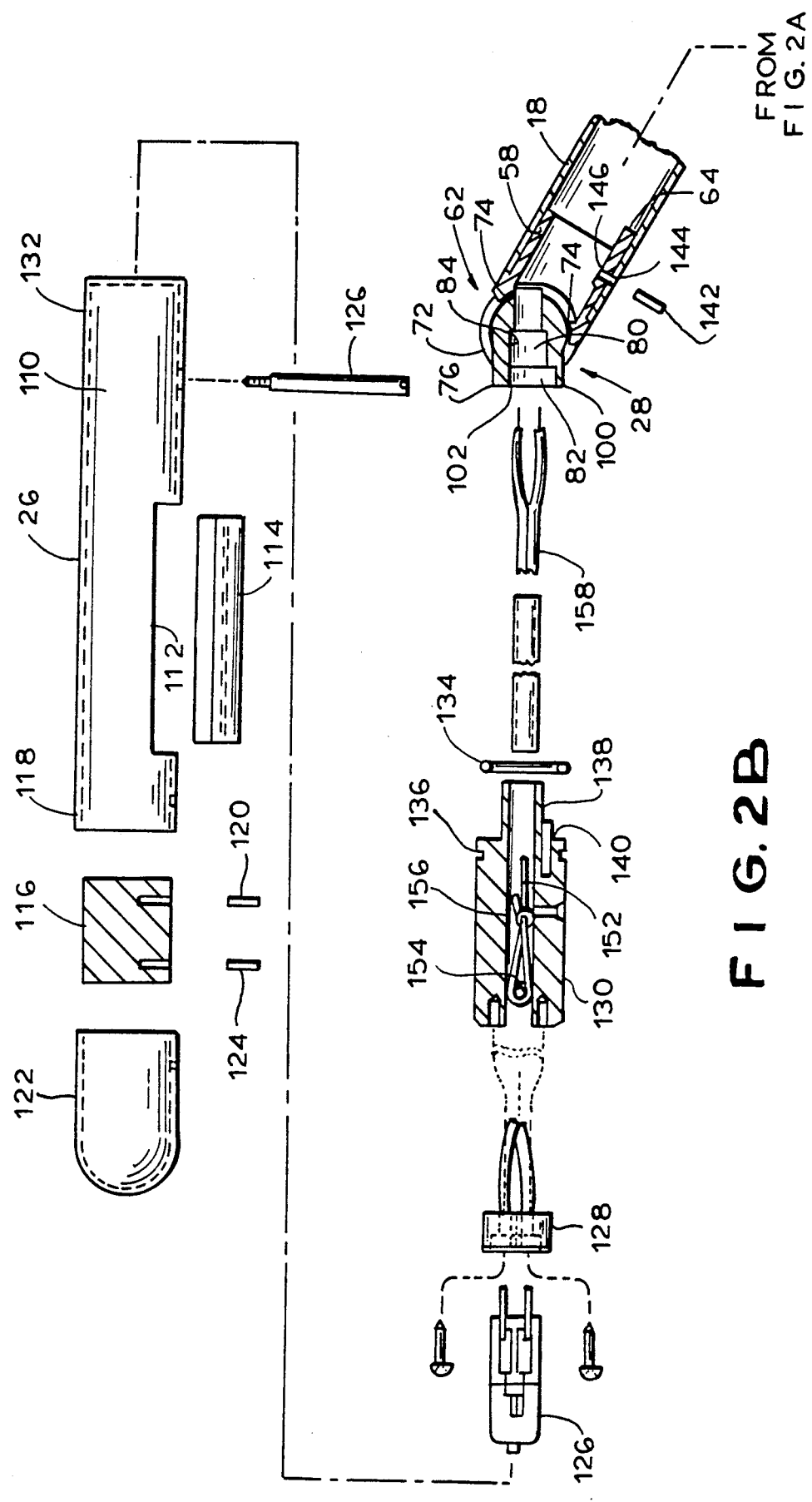

ARTICULATED LAMP

The present invention relates to articulated lamps, and more specifically to a lamp whose arms and head are articulated together through universal joints.

Articulated lamp assemblies have been previously proposed which are constructed in a variety of manners. Some lamps are counterbalanced by some external springs, and others by counterweights. With the development of the extremely small sized halogen bulb, the variety of articulated lamp constructions has increased dramatically, and a demand has developed for sleek, thin or so-called "minimalist" lamp constructions. One such lamp construction which has been previously marketed includes a simple base having a vertically extending support arm mounted thereon and transverse support arm, also formed of thin tubular material, mounted on the top of the vertical arm through a simple ball joint construction. The ball joint construction consists of a seat fixed in the upper end of the vertical support tube, a ball engaged in that seat and also in a seat mounted in the transverse support arm. The ball and its associated seats have passages formed therein which permit the electrical wiring for the lamp to pass therethrough. In addition, a spring-tensioned connecting member engaged between the transverse arm and the vertical arm and passing through the ball and seats, keep the ball joint assembled. A similar ball joint connection is formed between the head of the lamp and one end of the transverse arm. This construction provides a minimalist design for the lamp, while providing universal movement of the transverse arm relative to the vertical support arm and movement of the head on the transverse arm.

Although the design of the previously proposed lamp construction has been highly successful, difficulties have been encountered with this lamp construction because of the universal movement between the joint. Since the joints are free to move continuously in any one direction, the wires in the lamp can become twisted, frayed, and damaged. In addition, the components of the two joints, i.e. the joints between the two arms and the joint between the transverse arm and the head are formed of somewhat different components, thereby multiplying the number of components necessary to assemble the lamp and increasing the cost of manufacture and assembly.

It is an object of the present invention to provide an improved articulated lamp construction.

Another object of the present invention is to provide a universal joint construction suitable for use in an articulated lamp assembly.

Another object of the invention is to provide an improved universal joint construction.

A still further object of the present invention is to provide a lamp construction having multiple articulated joints wherein the joints use the same components.

Yet another object of the present invention is to provide an articulated lamp assembly which is relatively simple in construction and economical to manufacture.

In accordance with an aspect of the present invention, an articulated lamp construction having universal joint connections between its arms and head is provided which uses a joint construction that permits universal movement within or around 360°, but prevents excessive rotation of the joints in order to avoid twisting or damage of the internal wiring. In addition, the components of the joints are identical, so that the same components can be used in either joint. This reduces the cost of construction and substantially simplifies the assembly procedure.

Applicant has found that by the construction developed herein, the minimalist lamp design consisting of two transversely arranged arms and a lamp head, will pass current industry safety standards regarding wiring protection against unlimited twisting.

The above, and other objects, features and advantages of this invention will be apparent in the following detailed description of an illustrative embodiment thereof, which is to be read in connection with the accompanying drawings, wherein.

Figure 1:
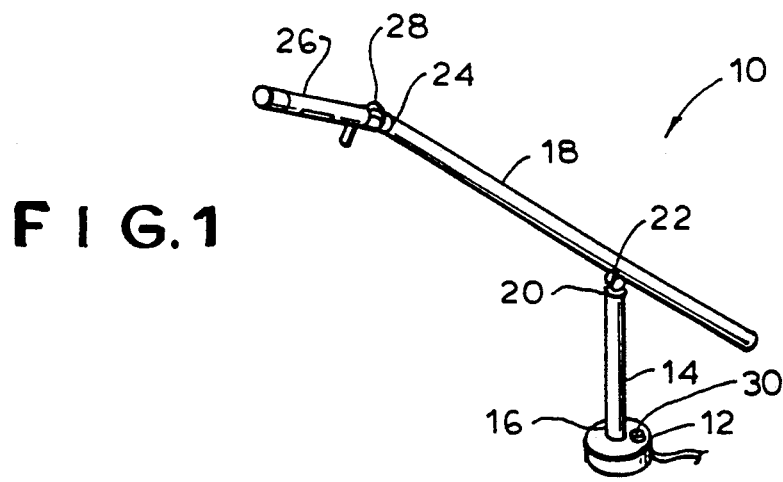
FIG. 1 is a perspective view of an articulated lamp constructed in accordance with the present invention.
Figure 3:
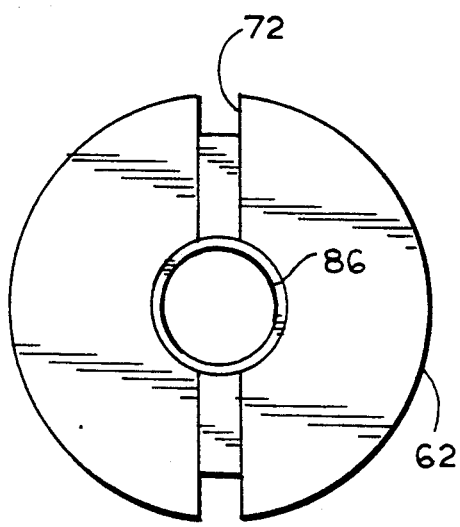
Figure 4:
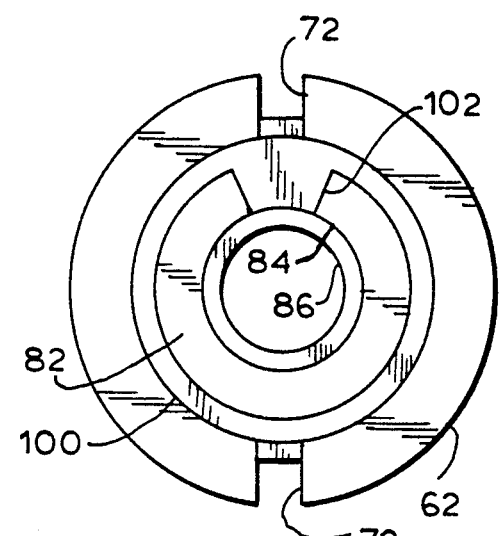
Figure 5:
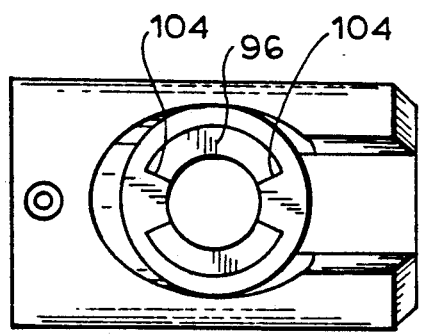
Figure 6:
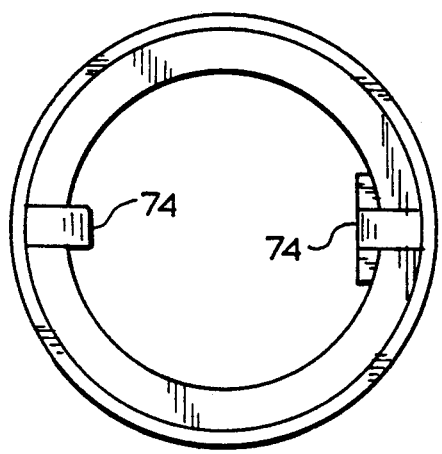
Figure 2A:
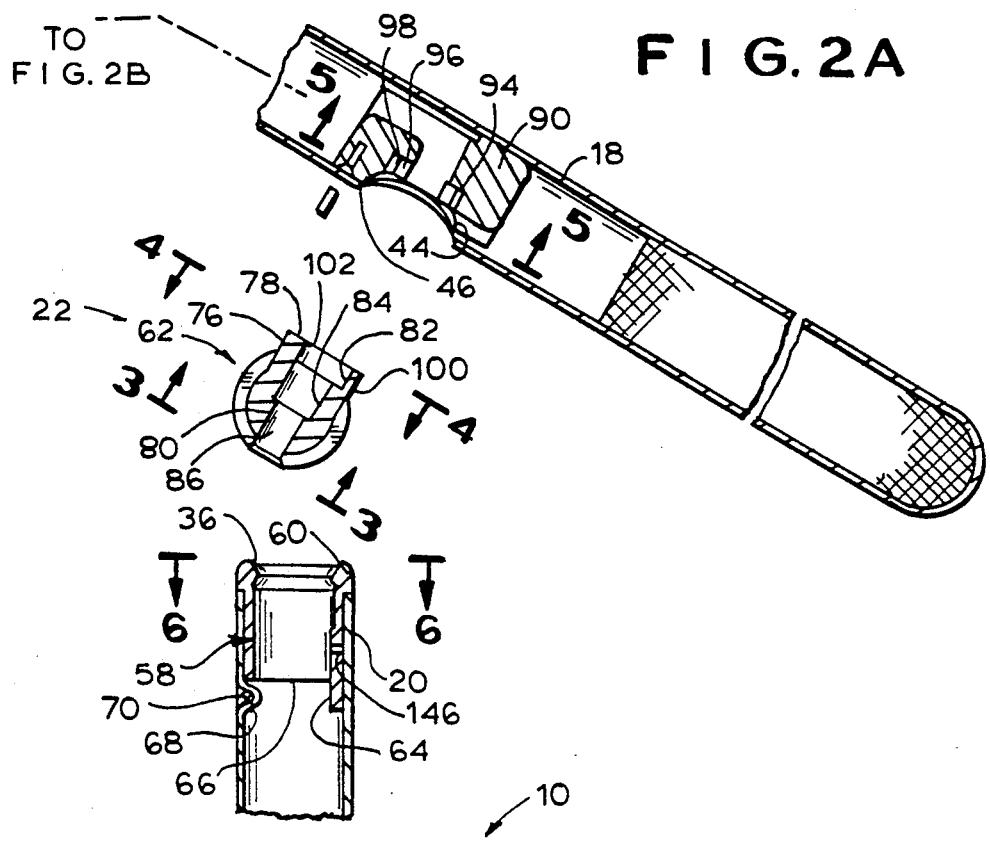

FIGS. 2a and 2b, together, are a partly exploded longitudinal cross-sectional view of the articulated lamp of FIG. 1;

FIG. 3 is an end view taken along line 3—3 of the ball joint used in the lamp of the present invention;

FIG. 4 is a view taken along line 4—4 of the opposite end of the ball joint;

FIG. 5 is a view taken along line 5—5 of the ball mount in the transverse arm of the lamp; and FIG. 6 is a plan view taken along line 6—6 of FIG. 2a showing the top of the ball seat sleeve used in the joints of the present invention.

Referring now to the drawings in detail, and initially to FIG. 1 thereof, an articulated lamp 10 constructed in accordance with the present invention is illustrated. The lamp includes a base 12 having a hollow vertically extending tube or arm 14 mounted therein. The tubular arm 14 has its lower end 16 secured in base 12 in any convenient manner as for example by swaging, so that it is held against rotation. A transverse or second arm 18 is connected to the upper end 20 of arm 14 through a universal ball joint assembly 22 constructed in accordance with the present invention. The upper or outer end 24 of arm 18 has a lamp head 26 mounted thereon by an articulation joint 28 also constructed in accordance with the present invention. Lamp head 26 consists of a tubular member containing a halogen light bulb. The electrical wiring for the bulb passes through joints 22, 28 and arms 18, 14 to base 12 in which a transformer (not shown) is located. Operation of this lamp is controlled by a hand switch 30 of conventional construction.

Figure 1A:
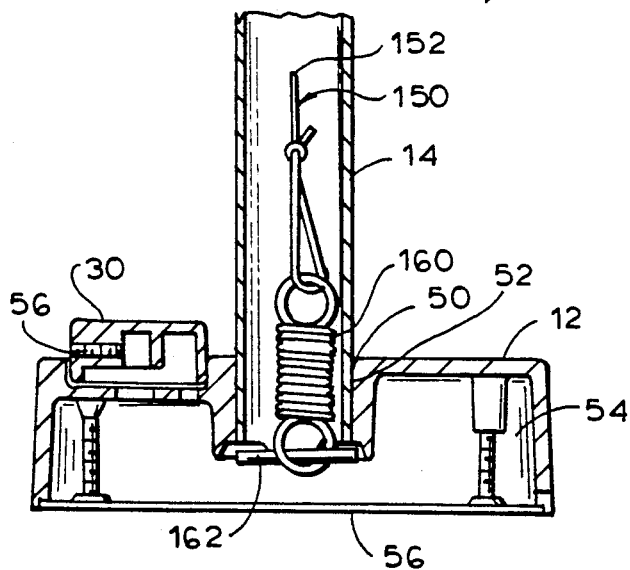
FIG. 1a is a sectional view of the prior art universal joint previously used in articulated lamps of the general design illustrated in FIG. 1.
Figure 1A:
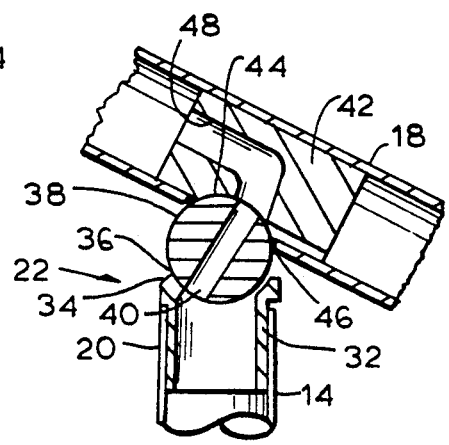

Articulated lamps having the overall appearance of the lamp illustrated in FIG. 1 have been previously proposed, manufactured and sold. In such lamps, the articulated joints 22, 28 are universal joints, one of which is illustrated in FIG. 1a. The joint of FIG. 1a represents the joint between vertical tube 14 and the transverse arm or second tube 18 on which lamp head 26 is mounted. In the prior art lamp, joint 22 was formed by a sleeve 32 which was mounted in the upper end 20 of tube 14 in a fixed position, as for example by pinning or swaging. The sleeve 22 has an upper end 34 which defines a ball seat 36 of generally frustro-conical configuration. A ball joint 38 is seated in seat 36 for rotation and movement on the seat surface. The ball has at a central port or bore 40 formed therein through which the wiring for the lamp passes.

In the prior art device the arm 18 includes a ball mount 42 having a ball seat surface 44 formed therein engaged with the surface of ball joint 38 through an opening 46 formed in arm 28. The mount 42 includes a central bore or passage 48 through which the electrical wiring of the lamp passes. In addition to the electrical wiring, the arms contained an elongated connecting string or cord, secured to a spring. The cord is connected at one end to the lamp head and at the other end the spring is connected to the lamp base, thereby to apply a spring bias force to the joint and hold the components together in the configuration illustrated in FIG. 1a. This arrangement permits arm 18 to rotate on ball 38 in order to allow adjustment of the position of arm 18 relative to arm 14. In addition, ball 38 can rotate on seat 34 to permit further adjustment of the relative positions of the arm.

A similar joint construction is provided at the joint 28 between arm 18 and head 26 in the prior art device. This arrangement in the prior art permitted substantial universal movement of the components relative to each other, but suffers from the deficiency that the wiring within the lamp can be twisted. In addition, the components forming the ball seats in the two joints were somewhat different, requiring a multiplicity of components.

An improved articulated lamp construction in accordance with the present invention is illustrated in FIGS. 2-6. As seen therein arm 14 has a lower end 50 received in a mounting port 52 formed in base 12. The arm is secured in the base by swaging or by an adhesive or the like and is thus held against rotation in the base. The base 12 has a hollow interior 54 whose bottom is closed by a cover 56 screwed into the base as illustrated in FIG. 2a. The control knob 30 is rotatably mounted in the base and secured by a set screw 56 to the control post of a rheostat and/or switch (not shown) connected to the lamp's wiring and transformer in order to control the operation and intensity of the lamp.

The upper end 20 of arm 14 is open and receives a sleeve member 58 which provides the ball seat 36 for the joint 22 of the invention. Sleeve 56 is a generally tubular member whose upper end 60 extends beyond the upper end of tube 14 and is slightly thicker than the remainder of the sleeve. Upper end 60 has an internal ring surface 36 which is generally spherically concave in shape, defining the seat surface for the spherical surface of the ball joint 62 of the present invention. Sleeve 58 includes an extension finger or tab 64 which is slightly thicker than the remainder of the sleeve and which extends below the bottom edge 66 of the sleeve. Sleeve 58 is free to rotate in the tube 14; however, the amount of rotation of the sleeve relative to tube 14 is limited by the engagement of finger 64 with a detent 68 formed in the tube by a pressing operation as would be understood by those skilled in the art. Preferably the external surface of detent 68 is filled with an epoxy putty 70, so that the external surface of the arm 14 remains flat and uniform for painting. Accordingly, although the sleeve 58 can rotate in tube 14, it cannot rotate through more than 360°. Alternatively, a separate pin mounted in tube 14 may be used in lieu of the detent 68.

Ball joint 62 of the present invention is formed as a generally spherical ball but, as seen in FIG. 3, the ball has a circumferential groove 72 formed therein along a diameter of the ball. The spherical surface of the ball is adapted to be seated in and engaged on the surface 36 of sleeve 58. However, the ball is held against rotation about the longitudinal axis of the sleeve and tube 14 by means of internally extending teeth or keys 74 formed on seat 36. these keys are received in groove 72 and thus restrict rotation of the ball relative to the sleeve. However, the keys do not prevent rotation of the ball about axes which are transverse to the longitudinal axis of tube 14 and sleeve 58.

Ball joint 62 also includes a cylindrical extension 76 formed integrally therewith. The cylindrical extension has a diameter which is slightly smaller than the diameter of the ball and extends to a base 78. A bore 80 is formed in ball 62 and has three bore sections. The first bore section 82, near base 78 of extension 76, has a first and largest diameter of the three bore sections. The second bore section 84 has an intermediate diameter and the remainder the third section 86 of the bore 80 has the smallest diameter. The bore 80 permits passage of the electrical wiring (not shown) for the lamp to extend from arm 14 through ball 62 and into arm 18.

A ball mount member 90 is positioned within arm 18 at the opening 46 formed therein for seating the extension 76 of the ball in arm 18. Ball mount 90 is slid into position in the arm in any convenient manner and pinned in place by pin member 92 in any known manner. Mount 90 includes a generally frustro-conical ball seat surface 44 formed therein for engaging the spherical surface of the ball. It also has a cylindrical recess 94 formed therein and a ring wall 96 contained in the recess, thereby to define a ring groove 98 in the ball mount inwardly of the seat surface 44. Ring groove 98 receives the annular wall 100 defined in extension 76 by bore 82.

In accordance with the present invention rotation of ball 62 relative to the arm 18 is prevented by the provisions of a key 102 formed on the internal surface of wall 100 at the bore 82 in ball 62. Key 102 (as seen in FIGS. 2a and 5) is adapted to be received in a gap 104 formed in the ring wall 96 of mount 90. Preferably two gaps 104, located on diametrically opposed sides of the 4ing 96, are provided so that assembly of the components is easier for the operator.

By this construction the articulated joint 22 permits universal movement as a result of the rotation of sleeve 58 about the longitudinal axis of tube 14 and by the rotation of ball joint 62 about axes transverse to that longitudinal axis. However, rotation of more than 360° in any direction is prohibited, thereby ensuring that the electrical wiring passing through the joints will not become unduly twisted.

In accordance with the present invention substantially the same joint components are used to articulate lamp head 26 to the upper end of arm 18. As seen in FIG. 2b, lamp head 26 consists of a cylindrical sleeve 110 having a cut-out 112 formed therein in which a translucent lens 114 is mounted in any convenient manner. A connection block 116 is mounted in the end 118 of sleeve 110 and is secured therein by a pin 120. An end cap 122 is provided over the block 116 and pinned in place by pin 124 in order to form a head having the configuration illustrated in FIG. 1. Preferably a standoff pin 126 is provided which is threaded into the sleeve 110. The standoff pin prevents the head from contacting the work surface, or papers on the work surface, when the head is moved to an extremely low position. This avoids undesirable direct contact of the lamp head, given the high heat intensity of halogen lamp bulbs, on the work surface.

The halogen bulb 126 used in the lamp of the present invention is of conventional construction and is removably mounted in a ceramic base 128 of known construction. Base 128 is mounted on a head mount member 130 which, like all of the joint members, may be formed of aluminum. The head mount member is generally cylindrical in shape and is adapted to be received in the free inner end 132 of the tube 110. A resilient ring 134 is mounted in a circumferential groove 136 in mount member 130 and serves to frictionally hold the lamp head tube 110 on the mount member 130. This permits the lamp head tube to be removed in order to expose the halogen bulb for replacement when necessary. Additionally, mount member 130 includes a threaded bore 137 which receives the inner end of standoff 126. This prevents inadvertent removal of the sleeve 110 from the mount.

Head mount 130 also includes a cylindrical extension tube 138 formed on its inner end. The outside diameter of extension tube 138 is generally complementary to the diameter of the bore 84 of ball joint 62. In accordance with the invention, joint 28, between tube 18 and the lamp head, utilizes the same ball joint construction and sleeve construction as in the joint 22. Thus, the reference numerals for the ball joint and sleeve in the joint 28 correspond to the corresponding elements of the joint 22. Accordingly, the ball joint 62 in articulated joint 28 includes a circumferential groove 72, an extension 76 and a three-section central bore 80, with a key member 102 extending inwardly of bore section 82 from wall 100.

With extension tube 138 of mount member 130 received in bore section 84 of ball joint 62, the lamp head 26 is free to rotate in the ball joint about the head's longitudinal axis. In order to prevent rotation of the lamp head through more than 360° with respect to the ball joint, a stop pin 140 is provided in mount member 130. Pin 140 is positioned to interfere with key 102 in the bore section 82 and thereby define a stop therebetween restricting relative rotation of the lamp head on the ball joint to less than 360°.

In the articulating joint 28, sleeve 58 is pinned in place by a pin 142 extending through an opening 144 in tube 18 and a corresponding opening 146 formed in sleeve 58 at the thicker portion thereof defined by the finger 64. This pinning of sleeve 58 in the articulating joint 28 prevents rotation of the sleeve about the longitudinal axis of tube 18.

The upper end of sleeve 58 in articulating joint 28 is identical to the upper end of sleeve 58 in joint 22 and includes a pair of teeth or keys 74 formed in the seat surface 36 which are engaged in groove 72. This arrangement prevents rotation of ball joint 62 about the longitudinal axis of tube 18 or sleeve 58, but permits rotation of the joint about axes which are perpendicular to the axis of tube 18. As a result, the head is mounted for universal movement on tube 18.

The head, articulating joints, and arms of the lamp of the present invention are held in assembled relationship with each other, with the ball joints in contact with their associated ball seats, by a resilient biasing arrangement 150. This arrangement consists of a flexible elongated member 152 which is secured at one end to a pin 154 positioned transversely across the central bore 156 of mount member 130. The member 152, which may be a cord, rope or wire, extends through mount member 130 with the electrical wiring 158 of the lamp head and through the bores in the ball joints, mount member 90 and through sleeves 58. The lower end of the cord 152 is secured in any convenient manner to a spring 160. The lower end of spring 160 is held in place in base 12 by a cross pin 162 positioned against the lower surface of the base, as seen in FIG. 2a. The tension spring 160 applies a tension force to cord 152 holding all of the components together, while not restricting the permitted degrees of rotational movement therebetween as described above.

Accordingly, it is seen that by the construction of the present invention a relatively simply designed lamp construction is provided which permits articulated movement of the lamp head and arms with respect to each other through a substantial degree of movement, which restricting movement to avoid unnecessary twisting of the wires. In addition, the articulated joint constructions are relatively simple and use the same components, thereby reducing manufacturing costs and facilitating assembly thereof.

Although an illustrative embodiment of the invention has been described herein with reference to the accompanying drawings, it is to be understood that various changes and modification maybe effected therein by one skilled in the art without departing from the scope of spirit of this invention.

What is claimed is:

1. An articulated lamp including first and second support arms and means for articulating said first arm to said second arm; said first arm comprising a hollow tube having a first open end portion and said second arm comprising a hollow tube having a central opening formed therein; said articulating means comprising a tubular sleeve rotatably mounted in the first open end portion of said first arm for rotation in the arm about the longitudinal axis thereof; cooperating means on said sleeve and first tube for preventing rotation of said sleeve in said tube through more than 360°; a joint member mounted in said sleeve for rotation about axes extending perpendicular to said longitudinal axis of the sleeve and second cooperating means on said sleeve and said joint member for preventing rotation of said joint relative to said sleeve about said longitudinal axis; said joint including an extension received in the opening of said second arm; means for providing a seat in said second arm for said joint extension mounted in the second arm at said opening; said joint extension and seating means including third cooperating means for preventing rotation of said extension in said seating means; and means for maintaining said sleeve in contact with said joint member and said joint extension in said seating means.

2. An articulated lamp as defined in claim 1 including a lamp head, said second arm having an open upper end, and second articulating means for articulating said lamp head to said open upper end of the second arm; said second articulating means including a joint member mounted in said open upper end of said second tube for pivotal movement about an axis transverse to the longitudinal axis of the tube; said joint member and second tube including cooperating means for preventing rotation of the joint member about the longitudinal axis of the second tube; and means for connecting the joint member to the head to permit rotation of the head through no more than 360° relative to the joint member.

3. An articulated lamp as defined in claim 2 wherein said means for connecting the joint member to the head includes a mounting member in said head having a cylindrical axial extension rotatably received in said joint member; a first stop extending from said axial extension and received in a recess in said joint member, and second stop means formed in said recess for engagement with said first stop to prevent relative rotation of a more than 360°.

4. An articulated lamp as defined in claim 3 wherein said articulating means includes a tubular sleeve mounted in said open upper end of said second tube and being substantially identical in shape to the tubular sleeve in said first arm; the tubular sleeve in the second arm being fixed against rotation in the second arm.

5. An articulated lamp as defined in claim 4 wherein said joint members are identical in shape with each comprising a generally ball-shaped member having a circumferential groove formed therein and a generally cylindrical extension whose diameter is less than the ball's diameter; and sleeves each having a generally spherically-concave seat formed therein for receiving the ball joint associated therewith and a pair of diametrically opposed teeth formed in said seats for engagement in the groove of their associated ball joints to prevent rotation about an axis perpendicular to the longitudinal axes of the sleeves.

6. An articulated joint for a tubular support arm comprising, a support sleeve adapted to be mounted in a tubular support arm, said support sleeve having a free end with a generally spherically-concave seat formed therein; a ball joint member adapted to be received and engaged in said seat; said ball joint having a circumferential groove formed therein and a cylindrical extension whose diameter is less than the diameter of the ball joint; said seat having at least one inwardly extending tooth formed therein for engagement in said groove to prevent rotation of the ball joint about the longitudinal axis perpendicular to the longitudinal axis of the sleeve; and a mount member engaged with said extension for supporting an object on the ball joint; said support seat, ball joint member and mount member each having a bore formed therein located to communicate with each other, and tension means adapted to be operatively engaged between said tubular support arm and mounting member and extending through said bores to hold the joint in an assembled condition.

7. An articulating joint as defined in claim 6 wherein said sleeve has a second end opposite said seat and an extension finger extending beyond said second end.

8. An articulating joint for a tubular support arm comprising, a support sleeve adapted to be mounted in a tubular support arm, said support sleeve having a free end with a generally spherically-concave seat formed therein; a ball joint member adapted to be received and engaged in said seat; said ball joint having a circumferential groove form therein and a cylindrical extension whose diameter is less than the diameter of the ball joint; said seat having at least one inwardly extending tooth formed therein for engagement in said groove to prevent rotation of the ball about the longitudinal axis perpendicular to the longitudinal axis of the sleeve; and a mount member engaged with said extension for supporting the object on the ball joint; said cylindrical extension on the ball joint having a base and a through bore formed therein along a diameter of the ball joint; said bore having a first diameter section in said base and at least one smaller diameter section inwardly of the base; said first diameter section of the bore having a radially inwardly extending key member.

9. An articulating joint as defined in claim 8 wherein said mount member has a cylindrical recess formed therein including an internal ring wall, defining a circular groove in said mount member outwardly of the ring wall and a central port within the ring wall; said groove being dimensioned to receive the annular wall of the ball joint extension defined by said first bore section; and said ring wall having at least one gap therein for receiving said key member of the ball joint to prevent rotation of the ball joint relative to the mount member.

10. An articulating joint as defined in claim 9 wherein said ring wall has two diametrically opposed gaps formed therein for selectively receiving said key.

11. An articulating joint as defined in claim 8 wherein said mount member has a tubular extension whose diameter is generally complementary to the diameter of said second bore section of the ball joint and is received therein thereby to prevent relative rotation between the mount member and the ball joint; said mount member including a stop extending parallel to and adjacent said extension whereby said stop interferes with the key during relative rotation therebetween to prevent relative rotation through more than 360°.

12. An articulated lamp including a base, a first support arm having upper and lower ends with said lower end being secured in said base and said arm extending upwardly therefrom, a second support arm having first and second ends, and means for articulating said first arm to said second arm between the first and second ends thereof; said articulating means comprising a ball seat rotatably mounted on the upper end of said first arm for rotation about the longitudinal axis of said arm; first cooperating means on said sleeve and first tube for preventing rotation of a said seat through more than 360° with respect to said first arm, a ball joint mounted in said seat for rotation therewith, second cooperating means on said ball joint and seat for limiting rotation of the ball on the seat about axes extending perpendicular to said longitudinal axis of the seat; a ball joint mount in said second arm engaged with said ball joint; and third cooperating means on said ball joint and ball joint mount for preventing rotation of the ball joint relative to said ball joint mount.

13. An articulated lamp as defined in claim 12 including means for maintaining said seat and ball joint mount in contact with said ball in assembled relation.

14. An articulated lamp as defined in claim 13 wherein said maintaining means comprises resilient means connected through said seat, ball joint and ball joint seat to said first and second tubes.

15. An articulated lamp as defined in claim 13 wherein said ball seat comprises a tubular sleeve rotatably mounted in the upper end of said first tube and having an outer end located at the outer end of said first tube said outer end having a generally frustro-conical ball seat surface formed thereon for engaging the spherical surface of the ball joint.

16. An articulated lamp as defined in claim 15 wherein said sleeve has a second end opposite said frustro-conical surface and said first cooperating means comprises and extension finger extending beyond said second end and a detent formed in said first tube in position to contact the finger during rotation of the sleeve to prevent rotation of the sleeve through more than 360° with respect to said first arm.

17. An articulated lamp as defined in claim 13 wherein said ball joint has a circumferential groove formed therein and said seat has at least one inwardly extending tooth formed therein for engagement in said groove whereby said groove and at least one tooth define and said second cooperating means to limit rotation of said ball on the seat for rotation about axes extending perpendicular to the longitudinal axis of the seat.

18. An articulated lamp as defined in claim 13 wherein said ball joint includes a cylindrical extension whose diameter is less than the diameter of the ball joint; said cylindrical extension having a base and through bore formed therein along a diameter of the ball joint; said bore having a radially inwardly extending key member formed in the extension near said base and said ball joint mount having a cylindrical recess formed therein including an internal ring wall defining a circular groove in said ball mount outwardly of the ring wall and a central port within the ring wall; said groove being dimensioned to receive the annular wall of the ball joint defined by said bore; and said ring having at least one gap formed therein for receiving said key member of the ball joint thereby to define with said key said third cooperating means preventing rotation of the ball joint relative to the ball joint mount.

19. An articulated lamp as defined in claim 18 wherein said ring wall has two diametrically opposed gaps formed therein for selectively receiving said key.

20. An articulated lamp as defined in claim 12 including a lamp head and second articulating means for articulating the lamp head on said first end of the second arm; said second articulating means including a ball joint seat mounted in a fixed position in said first end of the second arm and a ball joint engaged in said seat for rotation relative thereto; said ball joint and seat of the second articulating means including cooperating means for limiting rotation of the ball joint on the seat to rotating about axes extending perpendicularly to the longitudinal axis of said second arm.

21. An articulated lamp as defined in claim 20 wherein the ball joint and seat of the second articulating means are structurally identical to the ball joint and ball seat of the first articulating means.

22. An articulated lamp as defined in claim 21 wherein said ball joints each have a circumferential groove formed therein and said ball seats each have at least one inwardly extending tooth formed therein for engagement in said groove to prevent rotation of the ball joints about the longitudinal axes of said first and second arms, respectively.

23. An articulated lamp head as defined in claim 22 including means for maintaining said head, first and second articulating means and said arms in assembled relation.

24. An articulated lamp head as defined in claim 23 wherein said maintaining means comprises resilient means connected through said first and second articulating means to said head and said first arm.

25. An articulated lamp head as defined in claim 22 wherein said ball joints each have a cylindrical extension whose diameter is less than the diameter of the ball joint; said cylindrical extension having a base and a through bore formed therein along a diameter of the ball joint and defining a second bore section.

26. An articulated lamp head as defined in claim 25 wherein said second articulating means includes a head mount member mounted in the lamp head including a tubular extension whose diameter is generally complementary to the diameter of the second bore section of the ball joints and is received in the second bore section of the ball joint in the second articulating means thereby to permit relative rotation between the head mount member and the ball joints.

27. An articulated lamp including a base, a first support arm having upper and lower ends with said lower end being secured in said base and said arm extending upwardly therefrom, a second support arm having first and second ends, first articulating means for articulating said first arm to said second arm between the first and second ends thereof; said first articulating means comprising a ball seat rotatably mounted on the upper end of said first arm for rotation about the longitudinal axis of said arm; first cooperating means on said seat and first tube for preventing rotation of said seat through more than 360° with respect to said first arm; a ball joint mounted in said seat for rotation therewith; second cooperating means on said ball joint and seat for limiting rotation on the ball on the seat about axes extending perpendicular to said longitudinal axis of the seat; a ball joint mount in said second arm engaged with said ball joint; and third cooperating means on said ball joint and ball joint mount for preventing rotation of the ball joint relative to said ball joint mount; a lamp head; and second articulating means for articulating means for articulating the lamp head on the first end of the second arm; said second articulating means including a ball joint seat mounted in a fixed position in said first end of the second arm, a ball joint engaged in said seat for rotation relative thereto; said ball joint and seat of the second articulating means including fourth cooperating means for limiting rotation of the ball joint on the seat about axes extending perpendicularly to the longitudinal axis of the second arm.

28. An articulated lamp as defined in claim 20 wherein the ball joint and seat of the first and second articulating means are structurally identical.

29. An articulated lamp head as defined in claim 28 including means for maintaining said head, first and second articulating means and said arms in assembled rotation.

30. An articulated lamp head as defined in claim 29 wherein said maintaining means comprises resilient means connected through said first and second articulating means to said head and said first arm.

31. An articulated lamp as defined in claim 29 wherein said ball joints each have a circumferential groove formed therein and said ball seats each have at least one inwardly extending tooth formed therein for engagement in said groove to prevent rotation of the ball joints about the longitudinal axes of said first and second arms, respectively.

32. An articulated lamp head as defined in claim 31 wherein said ball joints each have a cylindrical extension whose diameter is less than the diameter of the ball joint; said cylindrical extensions each having a base and a through bore formed therein along a diameter of the ball joint; said bore having a first diameter section in said base and at least one smaller diameter section inwardly of the base; said first diameter section of the bore having a radially inwardly extending key member.

33. An articulated lamp head as defined in claim 32 wherein said second articulating means includes a head mount member mounted in the head including a tubular extension whose diameter is generally complementary to the diameter of the second bore section of the ball joints and is received in the second bore section of the ball joint in the second articulating means thereby to permit relative rotation between the head mount member and the ball joint.

34. An articulated lamp head as defined in claim 33 wherein said head mount member includes a stop adjacent to and extending parallel to said extension whereby the stop interferes with the key of the ball joint in the second articulating means during relative rotation therebetween to prevent relative rotation through more than 360°.

35. An articulated lamp as defined in claim 34 wherein each of said ball seats comprises a tubular sleeve having an outer end, the sleeve of the first articulating means being rotatably mounted in the upper end of said first tube with its outer end located at the outer end of said first tube and having a generally spherically-concave ball seat surface formed thereon for engaging the spherical surface of the ball joint; and the sleeve of said second articulating means being fixed in said first end of the second tube.

36. An articulated lamp as defined in claim 35 wherein said sleeves each have a second end opposite their spherically-concave seat surface and first cooperating means comprises and extension finger extending beyond said second end and a detent formed in said first tube in position to contact the finger during rotation of the sleeve to prevent rotation of the sleeve through more than 360° with respect to said first arm.

37. An articulated lamp as defined in claim 36 wherein the cylindrical extension of each of said ball joints has a base and a through bore formed therein along a diameter of the ball joint; said bore having a radially inwardly extending key member formed in the extension near said bore and said ball joint mount of the first articulating means having a cylindrical recess formed therein including an internal ring wall defining a circular groove in said ball mount outwardly of the ring and a central port within the ring wall; said groove being dimensioned to receive the annular wall of the ball joint defined by said bore; and said ring having at least one gap formed therein for receiving said key member of the ball joint thereby to define with said key said third cooperating means preventing rotation of the ball joint relative to the ball joint mount.

38. An articulated lamp as defined in claim 37 wherein said ring wall has two diametrically opposed gaps formed therein for selectively receiving said key.

* * * * *